Sept. 25, 1962         H. HURVITZ         3,055,258

BRAGG DIFFRACTION ULTRASONIC DEVICES

Filed Aug. 22, 1951         6 Sheets—Sheet 1

INVENTOR

Sept. 25, 1962  H. HURVITZ  3,055,258
BRAGG DIFFRACTION ULTRASONIC DEVICES
Filed Aug. 22, 1951  6 Sheets-Sheet 5

INVENTOR

3,055,258
BRAGG DIFFRACTION ULTRASONIC DEVICES
Hyman Hurvitz, 1313 Juniper St. NW., Washington, D.C.
Filed Aug. 22, 1951, Ser. No. 243,115
17 Claims. (Cl. 88—14)

The present invention relates to devices utilizing ultrasonic cells operating as Bragg diffraction devices.

Briefly described an ultrasonic cell comprises a medium in which ultrasonic waves may be propagated, plus an electro-mechanical transducer for generating such waves in the medium in response to electrical signals. Bragg diffraction occurs when light waves are directed into a transparent or translucent ultrasonic cell at an angle to the wave fronts of the ultrasonic waves, provided the width of the ultrasonic waves is sufficiently great and the wave length of the ultrasonic waves is sufficiently short. In such case reflection of light occurs in the cell, such that the angle of the incident light equals the angle of the reflected light, and the wave length of the reflected light is related to the wave length of the ultrasonic waves by the relation $$\frac{n\lambda}{L} = 2 \sin \phi$$

where $n$ is an integer equal to the order of diffraction, $\lambda$ is the light wave length, $L$ is the sound wave length and $\phi$ is the angle of incidence, equal to $\theta$, the angle of reflection. In this connection it should be recalled that $\phi \cong \sin \phi$ for small angles.

The subject of Bragg diffraction in ultrasonic cells is treated in Bell Telephone System Monograph B–1654, by G. W. Willard, published in the Journal of the Acoustical Society of America, vol. 21, pp. 101–108, March 1949. Reference is made to that article for technical details concerning the Bragg diffraction ultrasonic cell, its mode of operation, the conditions under which it operates, and its various known properties.

Summarizing these properties, insofar as they are of particular importance for the present applications, the angle of light incident to the cell is always equal to the angle of light reflected from the cell. For that angle there is a definite relationship between the wave length of the ingoing light and the wave length of the ultrasonic energy, which forms in effect a diffraction grating of the Bragg type within the cell. That relationship is given by the formula above recited, so that once an angle of incidence is selected, and a wave length of light is selected, there is only one wave length of sound which will permit reflection of light by the cell. Once a wave length of sound has been selected for the given angle of incidence, there is only one wave length of light which will be reflected by the cell. Once a wave length of ultrasonic energy and a wave length of light have been selected, there is only one angle of incidence for which light will be reflected by the cell. The above holds for refraction of any given order, i.e. for any one value of $n$.

The integer $n$ in the above equation may be ignored for the purposes of the present discussion, by setting its value equal to 1, and utilizing angles $\phi$ and wave lengths $\lambda$ and $L$ such that higher order spectra are of no importance to the operation of the system. While this imposes definite limitations on the system, these are not serious in practical effect. Obviously, any other order than the first may be employed, if desired.

It is a primary object of the present invention to provide devices utilizing the Bragg diffraction effect in ultrasonic cells, for various practical objectives.

It is one specific object of the invention to utilize Bragg diffraction effect in ultrasonic cells for analyzing the frequency content of a radio frequency spectrum.

It is another object of the invention to utilize Bragg diffraction effects in ultrasonic cells for effecting linear scanning of a spot of light in response to a control signal.

It is still another object of the invention to utilize Bragg diffraction effect in ultrasonic cells for effecting control of color passing through the cell, in response to a control signal.

Still another object of the invention resides in the provision of means for transmitting to a distance, by radio signals or the like, the color of an object under examination.

Another object of the invention resides in the provision of a system for converting light frequencies into radio frequencies, on a one for one basis.

A further object of the invention resides in the provision of a system for converting radio signals representative of light wave lengths, into colored light corresponding with the wave lengths of the light.

Still a further object of the invention resides in the provision of a system for transmitting colors to a distance by radio signals or the light, and reconverting the radio signals into colored light corresponding with that originally transmitted.

It is another object of the invention to provide a system for analyzing the frequency content of a source of light of unknown frequencies.

It is a further object of the invention to provide a system for recording a large number of signals on a photosensitive film, in terms of density of the record, and by means of only a single ultrasonic cell of the Bragg diffraction type.

It is a further object of the invention to provide a system of multiple recording by means of a single Bragg diffraction ultrasonic cell, wherein the recording is accomplished on a photosensitive film in terms of variable position laterally of the film.

Another object of the invention resides in the provision of a recording system for a large number of signals, utilizing a single Bragg diffraction cell, the recordings being of the variable width type.

It is a further broad object of the invention to provide various systems for recording in multiple on a single tape and by means of a single ultrasonic Bragg diffraction cell, a large number of signals.

It is still a further object of the invention to provide an extremely flexible pulse generator, capable of controllably generating extremely short pulses of any desired pulse repetition rate and duration, the minimum pulse duration being of the order of 1,000th of a microsecond.

It is another object of the invention to provide a system for transmitting time division multiplex signals, the pulses in the various time division channels being time position modulated.

It is still another object of the invention to provide a receiving system for signals transmitted in time division multiplex character, and time positioned modulated, by means of a single ultrasonic cell, the cell effecting recordings of the signals on a photo-sensitive film.

Another object of the invention resides in the provision of a novel stroboscope, capable of providing extremely short light flashes, of the order of $\frac{1}{1000}$ microsecond duration.

It is another object of the invention to provide a novel multi-colored stroboscope, wherein light flashes of different colors are independently controllable as to frequency and ruration.

A further object of the invention resides in the provision of a system for analyzing a radio frequency spectrum, and displaying the content of that spectrum on a cathode ray tube indicator, analysis being effected by a Bragg diffraction ultrasonic cell.

Another object of the invention resides in the provision of a system for scanning a spot of light in two dimensions in response to control signals, the system utilizing one Bragg diffraction ultrasonic cell for effecting scanning in one direction and another for effecting scanning in a direction at an angle to the first direction.

The above and still further objects, advantages and features of the inventions will become apparent upon study of the accompanying detailed description of various embodiments of the inventions, especially when taken in conjunction with the accompanying drawings, wherein.

Figure 1:
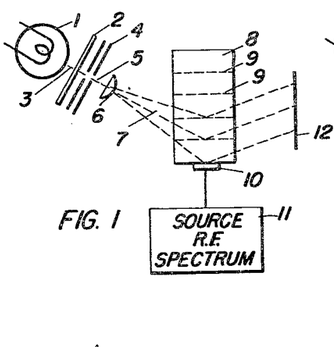
FIGURE 1 is a functional illustration of a system for analyzing any radio frequency spectrum, the system requiring no scanning, and the total analysis being accomplished by a Bragg diffraction ultrasonic cell.

Referring now more particularly to the accompanying drawings, in FIGURE 1 reference numeral 1 denotes a source of light, which may be white light if desired. The light deriving from the source 1 is filtered by means of a monochromatic filter 2, to provide light of a single frequency of known value. It will be realized that since the primary objective is to utilize light of a single frequency, that any desired mode of obtaining a beam of such light may be substituted for the light source 1 and the monochromatic filter 2.

The beam of monochromatic light 3 deriving from the monochromatic filter 2 is passed through a collimating device 4, which may be two parallel plates having small aligned holes therein, or which may be any other known type collimating device, such as lenses or the like. The narrow beam of monochromatic light deriving from the collimator 4 is represented at 5. The beam of light 5 is applied to a diverging lens 6, which spreads the narrow pencil 5 into a fan-shaped vertically oriented beam of light. It will of course be understood that the vertical orientation is of no moment and that any desired orientation may be employed. The fan-shaped beam of light 7 is applied to an ultrasonic cell 8, the various rays of the beam 7 making different angles of incidence with the wave fronts 9 of the waves in the ultrasonic cell 8, and the wave fronts being represented by dotted lines 9, the spacings of which have been grossly exaggerated in the drawings.

The cell 8 is provided with a transducer 10, to which is applied radio frequency signals from a source 11. The source 11 may be the output of a traveling wave amplifier, or of any other radio frequency amplifier, or of an intermediate amplifier of a superheterodyne receiver, or the like. However, derived, the waves are impressed on the transducer 10, and generate ultrasonic waves in the cell 8, the latter having wave lengths corresponding with the various frequencies present in the spectrum provided by the source 11. Since the light incident on the cell 8 is monochromatic, and of known wave length, each frequency present in the spectrum provided by the source 11 will correspond with one definite angle of incidence of the fan-shaped ray 7, and for that angle of incidence reflection will take place, in accordance with the formula governing Bragg diffraction. Accordingly, light will be reflected to a viewing screen 12, as positions representative of frequencies present in the source 11.

It will be clear that instead of one source 11 a number of such sources may be connected simultaneously to the transducer 11, as through a mixing amplifier, or the like, and it is not intended to be limited to a single source of radio frequency spectrum.

I have accordingly provided a system for analyzing radio frequencies, by means of a device which requires no moving parts, except for such motion as occurs in the transducer 10, and which is capable of providing a simultaneous analysis of a large number of signals over a wide band of frequencies. It will be further obvious, in the system of FIG. 1, as in all succeeding systems where a visual presentation is provided of the light deriving from a Bragg diffraction ultrasonic cell, that the reflected light may be diverged by a suitable lens system, to obtain a long scale against which a presentation may be viewed, or otherwise stated, to provide a wide separation between visual indications representative of adjacent frequencies of the R.F. spectrum.

Figure 2:
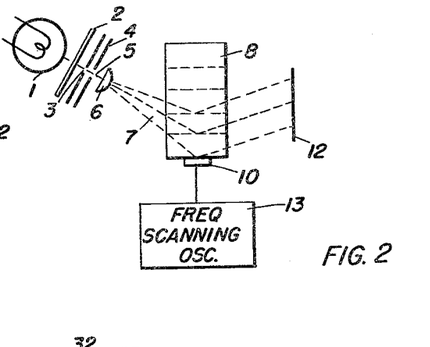
FIGURE 2 is a schematic representation of a system for scanning a spot of light in a single plane, the position of the light corresponding at all times with the frequency of a control oscillator.

In FIG. 2 of the accompanying drawings, elements 1–10 and 12 are identical with corresponding elements in FIG. 1, and accordingly description thereof is dispensed with. Instead of a source of radio frequency 11, there is provided in the system of FIG. 2 a frequency scanning oscillator 13, which may scan in any desired pattern, such as a saw-tooth or a sine wave pattern. As the frequency of the frequency scanning oscillator 13 varies, let us say for the sake of example, in a saw-tooth pattern, or linearly, the angle at which light is reflected by the cell 8 varies in correspondence with the frequency, and accordingly the light reflected by the cell varies in position along the screen 12 in synchronism with the scanning action.

Figure 3:
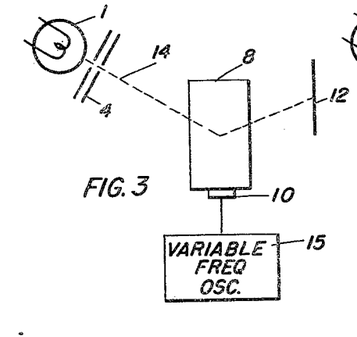
FIGURE 3 is a schematic representation of a system for controlling the color of light, by selecting from a source of white light any desired frequency, light frequency being selected in accordance with the frequency of a control oscillator or other variable frequency source.

In the system of FIG. 3, a source of white light 1 is provided, which is not filtered, but which is collimated by collimator 4, so that a pencil of white light 14 is applied to the cell 8 at an angle to the wave fronts therein, which contains all frequencies, or any desired range of frequencies. In the general case, the light 14 may be considered white light, and to contain all frequencies. To the transducer 10 of the cell 8 is applied signal from a variable frequency oscillator 15, and by varying the frequency the color of the light reaching viewing screen 12 may be modified. This is so since the angle of incidence of the light beam 14 is fixed, so that a correspondence exists between the wave length of the ultrasonic energy and the wave length of the light, a given light frequency corresponding with each ultrasonic wave length.

Figure 4:
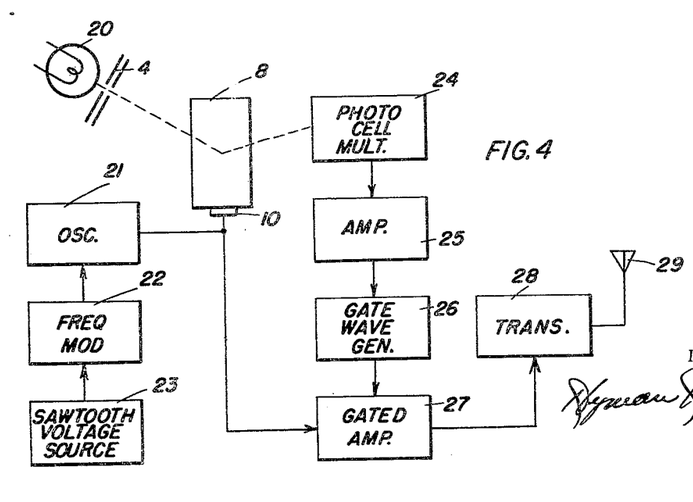
FIGURE 4 is a functional block diagram of a system for translating the color inherent in a source of light of unknown composition into corresponding radio frequencies, for transmission to a distance.

In FIG. 4 of the accompanying drawings, the source 20 of light is assumed to be light of unknown composition. It may be white light, or it may be colored light of a single frequency, or colored light comprising a plurality of frequencies. This light is collimated by a collimator 4, and applied at a definite angle of incidence on an ultrasonic cell 8 having a transducer 10. To the transducer 10 is applied the output of an oscillator 21, the frequency of which is controlled by means of a frequency modulator 22, actuated by a source of saw-tooth voltage 23. The character of the modulator 22 is not per se of importance, but for the sake of example it may be stated that a reactance tube modulator may be employed. Similarly, it is not of primary importance that a saw-tooth voltage source 23 is utilized, and if desired a sinusoidal wave modulating source may be utilized, or any other desired wave shape employed for modulation.

The oscillator 21 is caused to vary over a range of frequencies sufficiently great so that light of every frequency present in the source 20 is reflected by the cell 8, the frequencies of light being reflected in succession as the source 23 causes frequency scanning of the oscillator 21. The output of the light 8 is applied to a photo-cell multiplier 24, and the output of the latter is amplified in an amplifier 25 and applied to a gating wave generator 26. Essentially, the output of the photo-cell multiplier 24 is itself a gating wave, and the amplifiers 25 and the gating wave generator 26, which is essentially a further amplifier, may be dispensed with. The gating wave provided by the gating wave generator 26, or by the multiplier 24 if no gating wave generator is employed, is applied to gate on an amplifier 27, and to the input of the amplifier 27 is applied the output of the oscillator 21. The output of the gated amplifier 27 is applied to a transmitter 28 and transmitted by means of an antenna 29. It will be seen then that the frequency of the oscillator 21 is applied to the transmitter 28, and transmitted, only while light is impinging on the photo-cell multiplier 24, from the ultrasonic cell 8. If the source 20 were monochromatic, this would occur once in each scanning cycle, and one short pulse of energy would be passed by the gated amplifier 27, having a frequency, within the spectrum generated by the oscillator 21, corresponding with the frequency of the light incident on the cell 8. If a number of frequencies are present in the light provided by the source 20, a number of such frequencies will be passed by the gated amplifier 27. It will be noted that the signals passed by the gated amplifier 27 have frequencies which are functions of the frequencies or light content of the source 20, but also have time positions corresponding with these latter frequencies, since the oscillator 21 serves to scan in succession the frequencies in the light beam, and to discover these in turn as they exist.

Figure 5:
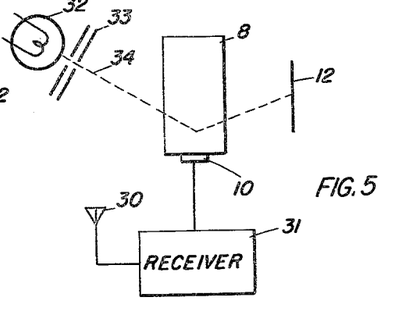
FIGURE 5 shows schematically a receiving system for translating the signals generated by the system of FIGURE 4 of the accompanying drawings into colored light corresponding with that originally ingoing to the system of FIGURE 4.

The signals transmitted from the antenna 29 may be received by a receiving antenna 30 (FIGURE 5) connected to a receiver 31, the output of which represents the frequencies passed by the gated amplifier 27. These are applied to the transducer 10 of an ultrasonic cell 8, in the system of FIG. 5, to which is applied white light from a source 32, the light being collimated by a collimator 33. The light beam 34, constituted of all frequencies in the visible spectrum, may be incident on the cell 8 at the same angle as the light in the system of FIG. 4 is incident on the cell of the transmitter illustrated in that figure. Accordingly, for each frequency present in the output of the receiver 31 and applied to the transducer 10, some definite frequency present in the beam 34 will be passed by the cell 8, and imposed on the viewing screen 12. During one scan of the oscillator 21 every frequency present in the source 20 will find a duplicate on the viewing screen 12, and the scanning being done at a rapid rate, above the persistence of vision, the color of the source 20 will be duplicated on the screen 12.

Figure 6:
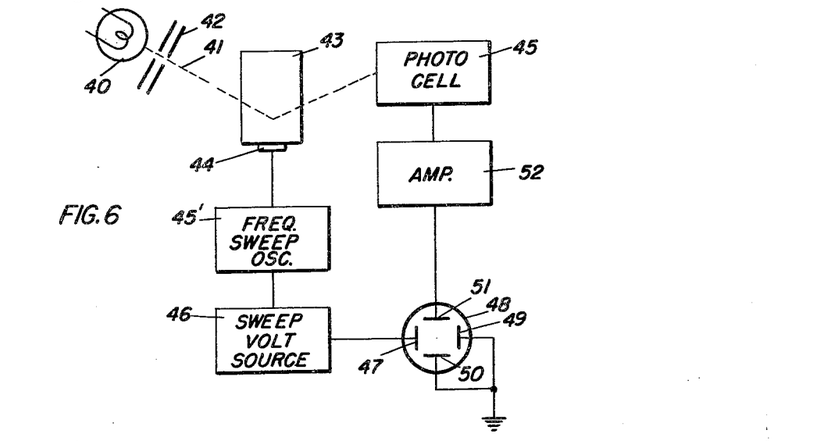
FIGURE 6 is a functional block diagram of a system for analyzing the content of a source of light of unknown frequencies, and displaying that content on the face of a cathode ray tube indicator.

In the system of FIG. 6 a source of light of unknown frequencies 40 is provided, it being desired to analyze the light and to determine its frequency components. The light deriving from the source 40 is collimated into a narrow pencil 41 by means of a collimator 42, and applied at a predetermined angle to the wave fronts present in an ultrasonic cell 43, supplied with ultrasonic energy by a transducer 44. The light reflected by the cell 43 impinges on a photo-cell 45, and there is connected to the transducer 44 the output of a frequency sweeping oscillator 45', controlled in respect to frequency via a sweep voltage source 46. As the frequency sweeping oscillator 45' sweeps over its predetermined range of frequencies the light frequencies present in the beam 41 are reflected whenever the proper relationship of frequencies exist, the light is then applied to the photo-cell 45. To this end the total range of frequencies provided by the oscillator 45' must be sufficiently great to accommodate the range of frequencies present in the source of light 40, in accordance with the governing formulas for Bragg diffraction in the ultrasonic cell. The output of the sweep voltage source 46 is applied to one horizontal plate 47 of a cathode ray tube indicator 48, the other horizontal plate 49 being grounded. One vertical plate 50 is similarly grounded and the remaining vertical plate 51 is connected to the output of the photo-cell 45 via a suitable amplifier 52.

It will be realized that instead of a photo-cell and amplifier 45, 52, that a photo-cell multiplier may be utilized, which may provide sufficient amplitude of signal, per se so that no further amplification is required.

In the system of FIG. 6 each lateral position of the beam of the cathode ray tube 48 corresponds with a definite frequency of the frequency sweeping oscillator 45', and accordingly with a definite frequency of light. For those frequencies of the frequency sweeping oscillator 45' for which reflection takes place in the cell 43, this occurs because a light frequency is present in the beam 41 which may be reflected at the wave length of ultrasonic energy corresponding with the frequency then provided by the oscillator 45'. At such times, then, vertical deflecting voltage is applied to the deflecting electrode 51, and a vertical pip results. As the oscillator 45' sweeps across its range of values, the beam of the cathode ray tube 48 sweeps horizontally across the face of the tube, and for each frequency of light present in the beam 41 a vertical pip will be present, on the face of the cathode ray tube 48, at a lateral position corresponding with the frequency of the light. The deflection will be representative of the intensity of the frequency component of the light. Accordingly on the face of the indicator 48 will be presented a spectrum analysis, against a frequency representative base line, of the frequency content of the light provided by the source 40.

Figure 7:
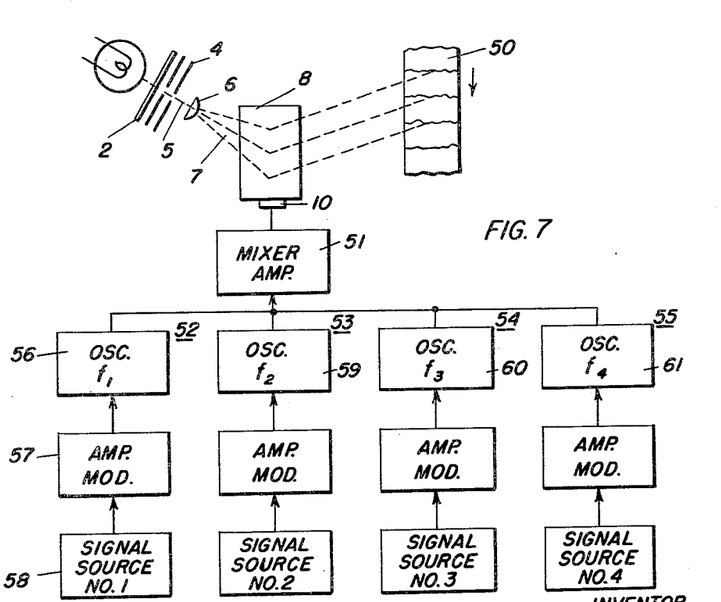
FIGURE 7 is a system of recording a plurality of signals by means of a single ultrasonic cell, at discrete positions along a photo-sensitive film, the signals being recorded in terms of variable intensity.

In the system of FIG. 7 is utilized a light valving arrangement corresponding with that of FIG. 1. Accordingly, corresponding numerals of reference are employed in the two figures and further description of the duplicated elements is dispensed with. The light outgoing from the cell 8 is applied to a moving photo-sensitive film, which may be considered moving perpendicular to the plane of the paper. Accordingly, if all frequencies present in the fan-shaped beam were passed by the cell 8, a laterally extended beam of light would be made on the film 50, as it moves. However, the cell 8 passes components of the fan-shaped beam 7 only in accordance with frequencies present on the transducer 10. In accordance with the invention of FIG. 7 the transducer 10 is driven by a mixer amplifier 51, which serves to combine a plurality of signals, without introducing new frequency components. To the input of the mixer amplifier 51 is applied the outputs of four distinct channels 52, 53, 54, and 55. It will be realized that the number four is selected at random, and that if desired as many as a hundred different channels may be employed, or that a single channel may be employed. It is a particular virtue of the system of FIG. 7 however, that a very large number of recording channels is provided by means of a single ultrasonic cell.

Channel 52 comprises an oscillator 56 of predetermined frequency $f1$. The output of the oscillator 56 is amplitude modulated by an amplitude modulator 57 in response to signal deriving from a signal source 58. The signal source 58 is deliberately represented as of general character, and may represent a microphone, or a measuring element, or an electromagnetic transducer of some type, or the output of a radio receiver, or the like. Since the oscillator 56 is of one definite frequency, it enables, when applied to the ultrasonic cell 8, transmission of one only of the light rays in the fan-shaped beam 7. Since the output of the oscillator 56 is amplitude modulated, the reflecting action of the cell 8 varies in accordance with the amplitude modulations, since these determine the intensities of the ultrasonic waves present in the cell 8. Accordingly, for one angle of reflection, corresponding with the frequency output of the oscillator 56, there will be present a line on the film 50. This line will have variable density in accordance with the amplitude of the signals provided by the signal source 58. In the further channels 53, 54, and 55, are provided further oscillators 59, 60, and 61, each of the oscillators providing a signal of a different frequency, so that each one controls a different ray of light present in the fan-shaped beam 7. Accordingly, there will be provided a number of adjacent laterally displaced recordings, each corresponding in lateral position with the frequency of one of the oscillators 56, 59, 60, and 61, and each density modulated in accordance with the amplitude of the signal provided by a signal source.

Figure 8:
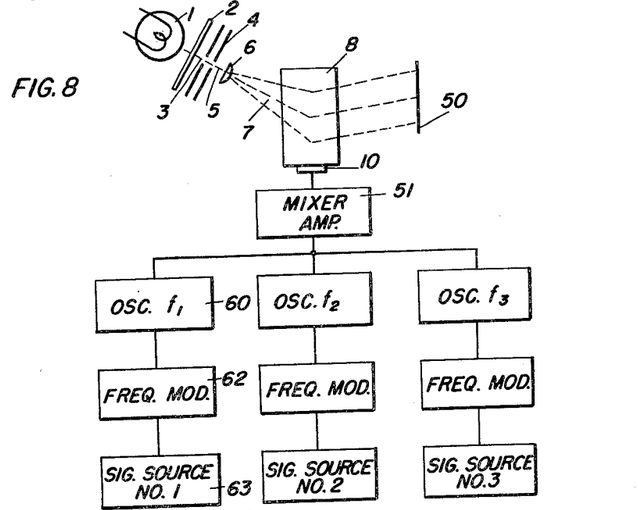
FIGURE 8 is a system corresponding with that of FIGURE 7, except in that the recordings are in terms of variable position.

The system of FIG. 8 is similar to that of FIG. 7, except in respect to the character of the modulation applied to the oscillators. In addition, only three signaling channels are indicated. However, this is a matter of choice, and, of desired utilization of the system. The same numerals of reference are applied to identical parts in FIGURES 7 and 8. In the system of FIG. 8 the oscillator 60 in one channel is frequency modulated by a frequency modulator 62 in response to signal deriving from a signal source 63. The distinction from the system of FIGURE 7 is, then, that the frequency of the oscillator is varied whereas in FIGURE 7 the amplitude of the oscillations were varied. By varying the frequency of the oscillation the ray of light selected from the fan 7 is varied in accordance with the frequency of the oscillator 60, and a scanning action occurs laterally of the moving film 50, in accordance with principles already explained in connection with FIG. 2 of the accompanying drawings. It follows that the record made on the film 50 will, in the case of FIG. 8, be of the variable position type, i.e. lateral position of the recording on the film is representative of the amplitude of the signal provided by the source 63. As in the system of FIG. 7 a large number of oscillators having discrete frequencies $f1$, $f2$, $f3$, may be provided, and the frequency modulation applied to the separate oscillators may be such that no overlapping occurs, if such results are desired. In any event each oscillator will cause a different recording to occur, and the recording will be position modulated laterally of the film in accordance with the input signal for each oscillator.

Figure 9:
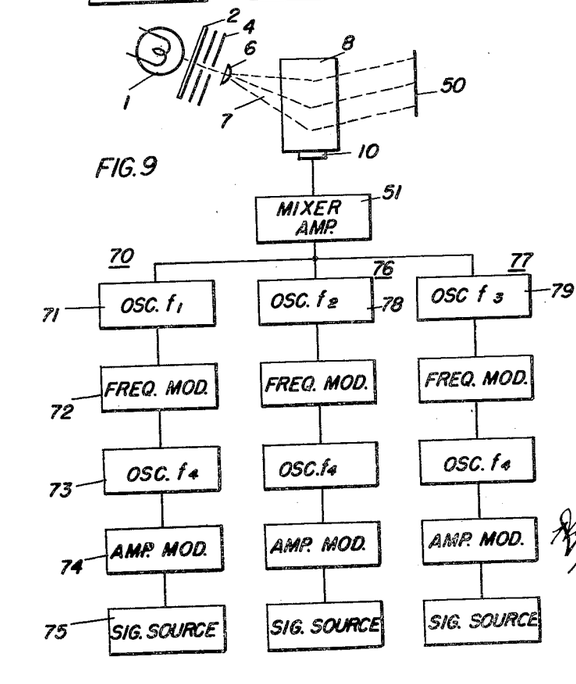
FIGURE 9 is a variation of the systems of FIGURES 7 and 8, in which the recording is in terms of variable widths.

The system of FIG. 9, of the accompanying drawings, is similar to that of FIGURES 7 and 8, except that variable width multiple recording is accomplished. Accordingly, where parts are identical, the same numerals of reference are utilized in FIGURES 7 to 9. Considering one channel 70 in the system of FIGURE 9, an oscillator 71 is provided, which may be frequency modulated by a frequency modulator 72 in response to the output of a relative low frequency oscillator 73. The amplitude of output of oscillator 73 may be controlled by an amplitude modulator 74 in response to signal deriving from a signal source 75. The remaining channels 76 and 77 are duplicates of channel 70, except that the high frequency oscillators 78 and 79 have different frequencies from each other and from the oscillator 71, so that each oscillator may provide an independent recording on the moving film 50, at a different lateral position thereof.

In operation, the frequency of the oscillator 71 determines the lateral position of the recorded line. Since the oscillator 71 is frequency modulated by frequency modulator 72 the position of this line varies laterally of the film in accordance with the modulations. However, the modulations appear at a rapid rate, say at 100,000–300,000 cycles per second, and the film moves at a relatively slow rate, so that a variable width recording is accomplished, the width of the recording corresponding with the frequency deviations of the oscillator 71. These frequency deviations are controlled by controlling the amplitude of output of the oscillator 73.

Figure 10:
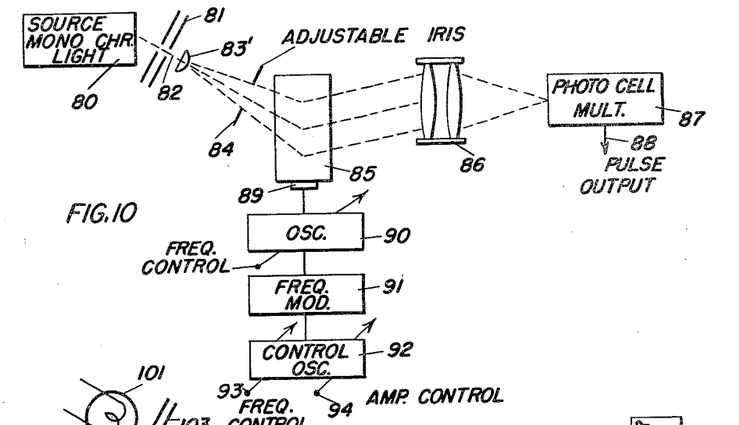
FIGURE 10 is a functional block diagram of a pulse generator, capable of generating pulses of variable width and repetition rate, down to extremely short durations of the order of $\frac{1}{1000}$ microseconds.

In FIGURE 10, of the accompanying drawings, is illustrated a pulse generator of novel character. A source of monochromatic light 80 is provided, which may be derived by means of a light source of any character coupled with a monochromatic light filter, or in any other desired fashion. The output of the light source 80 is collimated by a collimator 81, and the resulting pencil of light 82 is caused to diverge in a vertical fan 83 by means of a diverging lens 83'. Fan-shaped light beam 83 is passed through an adjustable iris 84, the purpose of which is to enable adjustment of the total width of the fan of light as it impinges on the ultrasonic cell 85 at an incident angle to the wave fronts in that cell. The light reflected by the cell 85 is collected by a lens system 86 and applied to a photo-cell multiplier 87, the output of which, on lead 88, represents the desired pulse output. The ultrasonic cell 85 is driven by a transducer 89, activated by an oscillator 90, which is frequency swept by a frequency modulator 91 in response to the output of a low frequency control oscillator 92. The frequency of the control oscillator 92 controls the repetition rate of the output pulses. The amplitude of the output of the control oscillator 92 controls the durations of the output pulses. Accordingly, a frequency control 93 and an amplitude control 94 are provided for the control oscillator 92.

In operation, the oscillator 90 sweeps in frequency, and the sweep may be sufficiently great in extent that for low frequency values supplied by the oscillator 90 and for the highest frequencies supplied by the oscillator 90, no light is reflected by the cell 85, while for intermediate values the angle of incidence of the light is properly related to the frequency of the light and to the frequency output of the oscillator 90 to enable reflection to occur. Under these conditions, as the oscillator 90 varies in frequency light will be applied to the photo-cell 87, and then interrupted. If the control oscillator 92 is of the saw-tooth type, and if the phenomena occurring during the retrace time of the oscillator 92 be ignored, as occurring too rapidly to be followed by the transducer 89, then each cycle of sweep of the oscillator 90 will result in one pulse of output on the photo-cell multiplier 87. Accordingly, by changing the frequency of the control oscillator 92 the frequency of the pulses may be correspondingly varied. At the same time the total deviation of the oscillator 90 is controlled by the amplitudes of the control oscillator 92. If this oscillator is of small amplitude, the oscillator 90 will suffer relatively small frequency excursions, and light will be passed to the photo-cell 87 over most of the time of these excursions. Thereby long pulses will result. If, however, the oscillator 90 sweeps over extremely wide frequency ranges, the frequencies applied to the transducer 89 will be adequate to enable light reflection from the cell 85 only over a relatively small proportion of the time of the sweep. Thereby the output of the photo-cell multiplier 87 will consist of short pulses. Obviously, the beam of light incidence in the cell 85 may be reduced to an extremely narrow pencil, by means of the adjustable iris 84, so that only for a very, very narrow range of frequencies provided by the oscillator 90 will any light reflection take place. Accordingly, by suitably adjusting the iris 84, and by suitably adjusting the total sweep of the oscillator 90, the pulses provided by the photo-cell multiplier 87 may be made extremely short. It is well known that the response of a photo-cell is extremely rapid, of the order of one thousandth microsecond. In the present system, the limitation on the minimum length of pulse which may be generated is the response time of the photo-cell. Accordingly, pulses may be generated which are as short as one thousandth microsecond.

Figure 11:
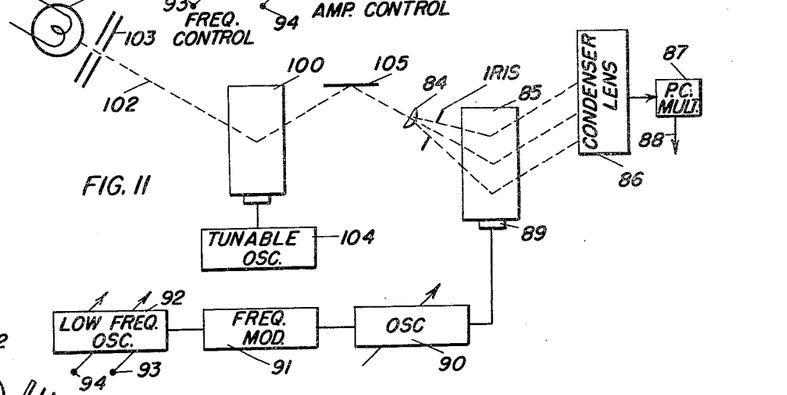
FIGURE 11 is a modification of the system of FIGURE 10, which provides further flexibility in the system, and provision for varying the phase of the generated pulses.

The system of FIG. 11 is similar to that of FIG. 10, except that an auxiliary ultrasonic cell 100 is provided, which is utilized as a source of monochromatic light, of variable frequency. To this end a source of white light 101 is utilized, the output of which is collimated into a narrow pencil 102 by means of a collimator 103. The narrow pencil of white light 102 is incident on the auxiliary ultrasonic cell 100 at a predetermined angle. Since all frequencies of visible light are incident on the cell 100, a very wide range of ultrasonic input frequencies, deriving from the tunable oscillator 104, will result in output of reflected light from the cell 100. However, the reflected light will vary in frequency in accordance with the frequency of the output of the tunable oscillator 104. Accordingly, the ultrasonic cell 100, with its auxiliary apparatus, operates with a source of light of variable frequency. The output light from the cell 100 is reflected by means of a mirror 105 to the lens 84, which serves the same function as does the lens 84 in the system of FIG. 10.

By varying the frequency of the light incident on the ultrasonic cell 85, the phase of the pulses deriving from the photocell multiplier 87 may be varied, which adds flexibility to the pulse generating system. In addition, if desired, the tunable oscillator 104 may be controlled in respect to frequency by means of a signal, in which case the output pulses may be time positioned modulated in correspondence with the amplitude of the signal.

Figure 12:
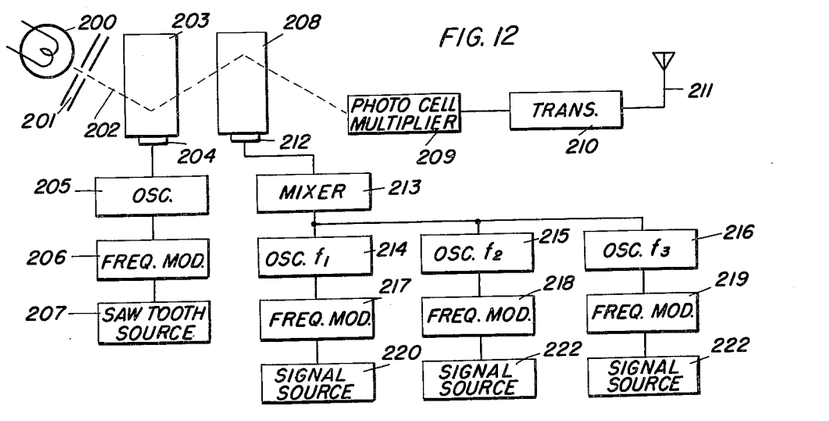
FIGURE 12 is a functional block diagram of a system for transmitting a plurality of signals on a single channel, by time division multiplexing signals, the individual signals being transmitted in terms of time positions of pulses.

In FIG. 12, of the accompanying drawings, is illustrated a system for time division multiplexing a plurality of signals, each signal being represented by time positions of pulses in its own time division channel.

In the system of FIG. 12 is provided a source of white light 200, which is collimated by a collimator 201, so that a narrow pencil of light 202 is provided, which is incident on an ultrasonic cell 203 at a predetermined angle to sonic wave fronts therein. The transducer 204 of the cell 203 is supplied with oscillations from an oscillator 205, the oscillations being frequency modulated by a frequency modulator 206 in response to saw-tooth voltage provided by a saw-tooth source 207. The net effect is that the color of the light outgoing from the cell 203 varies continuously as the frequency of the oscillator 205 is swept, and any range of light frequencies may be selected, by properly choosing the frequencies over which the oscillator 205 sweeps. The output light from the cell 203 is incident on a further ultrasonic cell 208, and the output of the latter is applied to a photo-cell multiplier 209. The output of the photocell multiplier 209, which consists of a plurality of pulses, is applied to a transmitter 210 for transmission via an antenna 211. The transducer 212 of the cell 208 is driven from a mixer 213, supplied with signals from any number of oscillators 214, 215, 216, three being selected to avoid unnecessary amplification of the drawings. The oscillators 214, 215, and 216 each oscillates at a different frequency, and the oscillators are modulated in frequency by frequency modulators 217, 218, and 219 respectively, which are driven from signal sources 220, 221 and 222 respectively. Since the output frequencies of the oscillators 214, 215, and 216 are different, each oscillator will cause reflection of light in the cell 208 at a different light frequency. Since the light frequencies are constantly changing, the light impinging on the photo-cell 209 will be in succession light caused to reflect in response to signals deriving from the oscillators 214, 215, and 216 in succession. Thereby the output of the transmitter 210 is of the time division type, meaning that the outputs of the oscillators 214, 215, and 216 are sampled in succession, and pulses transmitted in succession, in correspondence with the sampling. At the same time the frequency of the oscillators 214, 215 and 216 is varied in accordance with signals. Each variation of frequency results in a different time of transmission of a pulse from the photo-cell multiplier 209. Accordingly, the pulses transmitted in the time division channels are themselves time position modulated.

Figure 13:
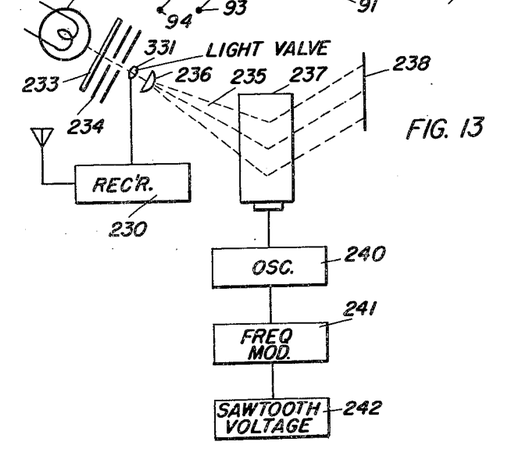
FIGURE 13 is a system for detecting and recording a signal transmitted by the system of FIGURE 12.

The signals transmitted from the transmitter 210 may be received by means of a receiver 30, the output of which is applied to a light valve 231, which normally blocks light, and which in response to each pulse signal deriving from the receiver 230 passes a pulse of light. The light impinging on the cell modulator valve 231 derives from a monochromatic light source comprising a lamp 232 and a monochromatic filter 233, and this light further is collimated by a collimator 234. A beam of light deriving from the output of the light valve 231 is caused to diverge into a fan-shaped beam 235 by means of a diverging lens 236. The divergent beam of light 235 impinges on an ultrasonic cell 237, at a suitable angle, and the reflected light deriving from the cell 237 impinges on the photo-sensitive moving film 238, which is assumed to move perpendicular to the paper of the drawings. The cell 237 is driven from an oscillator 240, the frequency of which is modulated by a frequency modulator 241 in response to a saw-tooth voltage 242. As the frequency of the oscillator 240 varies the angle at which light may be reflected by the cell 237 similarly varies. There is, accordingly, an effective scan of a single ray of light transversely of the reporting film 238. If, then, the saw-tooth voltage 242 is synchronized with the saw-tooth voltage 207 of FIG. 12, as may be accomplished by means well known in the art, the time divided signals transmitted from the transmitter 210 are recorded at definite positions laterally of the photo-sensitive film 238, each at a definite mean position of the film. At the same time the time position modulation of the pulses is taken account of, in terms of the time when light is passed through the cell 231, to cause lateral deviation of the recorded line, in accordance with the time positions of the pulses.

Figures 14, 15:
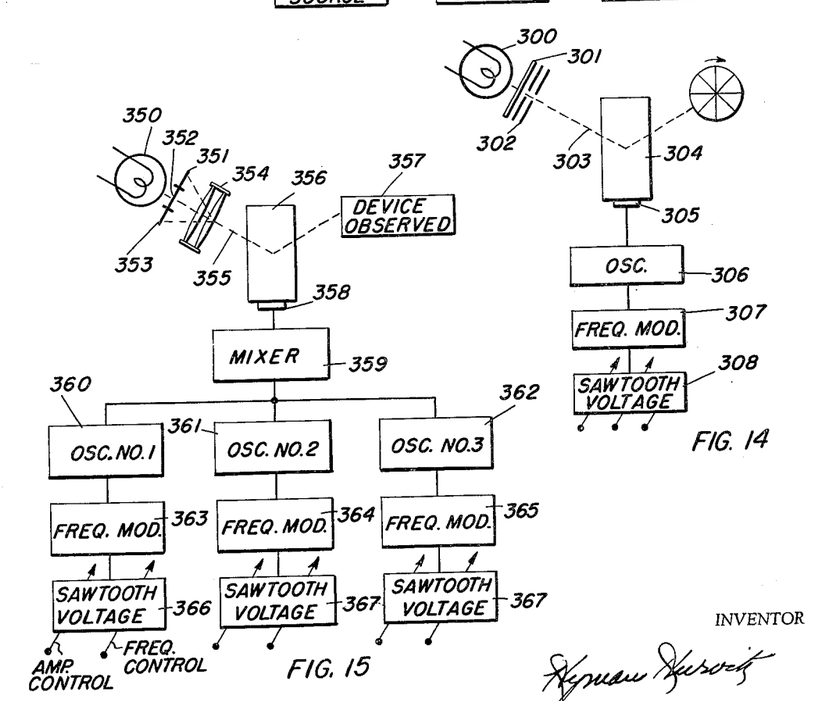
FIGURE 14 is a functional block diagram of a stroboscope, for producing extremely short light pulses, of the order of $\frac{1}{1000}$ microsecond or less.
FIGURE 15 is an improvement of the system of FIGURE 14, wherein provision is made for producing stroboscopic light of different colors, and in independently adjustable frequencies in the various colors.

In FIG. 14, of the accompanying drawings, is illustrated a light stroboscope, i.e., a device for producing short bursts of light, of controllable frequency, which may be utilized to illuminate a moving object, and by proper selection of the rate of illumination as compared with the movement of the object, the object may be caused to appear stationary, or to be moving at a reduced rate of speed.

Light stroboscopes of the character briefly described are broadly well known in the art. In accordance with the present invention, however, a stroboscope is provided which generates extremely short pulses of light, which are in fact far shorter than those which can be produced by any means known to me in the prior art.

In the system of FIG. 14 a source of white light, which may be very intense, is provided, identified by the reference numeral 300. This white light is filtered by a monochromatic filter 301 and collimated by a collimator 302. It will be realized that, if desired, instead of a source of white light coupled with a monochromatic filter, a source of light of substantially a single frequency may be generated in any known fashion, as by means of a mercury lamp or the like. Monochromatic light 303, however produced, is imposed on an ultrasonic cell 304, at a suitable angle to the wave fronts in the cell. Thereupon, if the cell is driven at suitable frequency, light will pass, and when not so driven, light will not pass. To this end, the transducer 305 of the cell is driven by an oscillator 306, the frequency of which is varied continually by a frequency modulator 307 under control of a saw-tooth voltage source 308. The mean frequency and the frequency range of modulation of the oscillator 306 are selected so that at one point in the oscillations light will be reflected, and so that for all other values of output frequency of oscillator 306 no light will be reflected. Thereby, short bursts of light may be emitted from the cell 304. The intensity of the burst is directly related to the intensity of the source beam 303. The duration of the pulses is directly related to the width of the beam 303 and to the rate at which the oscillator 306 changes frequency. By changing the frequency of the saw-tooth oscillator 308 by means of a control device 309 the rate of pulsation of light may be correspondingly varied. At the same time by varying the amplitude of the saw-tooth source 308 by means of a control 310 the frequency excursions of the oscillator 306 may be increased or decreased, thereby modifying the total proportion of the time for which the oscillator 306 has a proper frequency to reflect light from the cell 304.

The primary advantage of the system of FIGURE 14, accordingly, is that extremely short pulses, of less than one thousandth microsecond, may be generated, and second that the frequency and duration of the pulses may be very readily controlled.

In the system of FIG. 15 is illustrated an improvement of the system of FIG. 14, wherein the stroboscope is of the multi-colored type, that is pulse light of several frequencies is generated, and the light of each frequency is subject to independent control as to pulse duration and pulse rate. To this end the source of white light 350 is provided, and from that source is selected light of any number of different colors. For the sake of example, I have shown a system utilizing three colors, and accordingly light is selected by a red filter 351, by a blue filter 352, and by a green filter 353. The light from the separate filters is collected by means of a lens system 354 and applied as a pencil of light 355 at a predetermined angle on an ultrasonic cell 356. The output of the cell is applied to a device being stroboscopically observed, which is indicated functionally as a block 357. In order to cause the generation of pulses of different color at independent rates, the transducer 358 of the cell 356 is driven from a mixer 359 to which is applied the output of three oscillators of different frequencies 360, 361, 362. If desired, the mean frequencies of the oscillators 360, 361, and 362 may be so selected that they will enable reflection of red, blue and green light, respectively at the incident angle assumed by the beam 355. However, each of the oscillators 360, 361, 362 is frequency modulated, frequency modulation occurs in response to frequency modulators 363, 364 and 365 respectively, which are driven by saw-tooth voltage sources 366, 367, and 368, respectively.

As in the system of FIG. 14 of the accompanying drawings, the saw-tooth oscillators 366, 367, 368 may be controllable in respect to frequency and amplitude of output. But this control is independent in respect to the several saw-tooth voltages. Since each one of the oscillators 360, 361, 362 serves to interrupt or control the passage of light of a different one of the colors incident on the beam 355, it will be appreciated that the pulsing of each of the three separate light colors is independent of the pulsing of any of the other light colors. Each color may be controlled in respect to pulse duration and pulse rate, and the minimum pulse duration may be extremely small, of the order of less than a thousandth microsecond.

Figure 16:
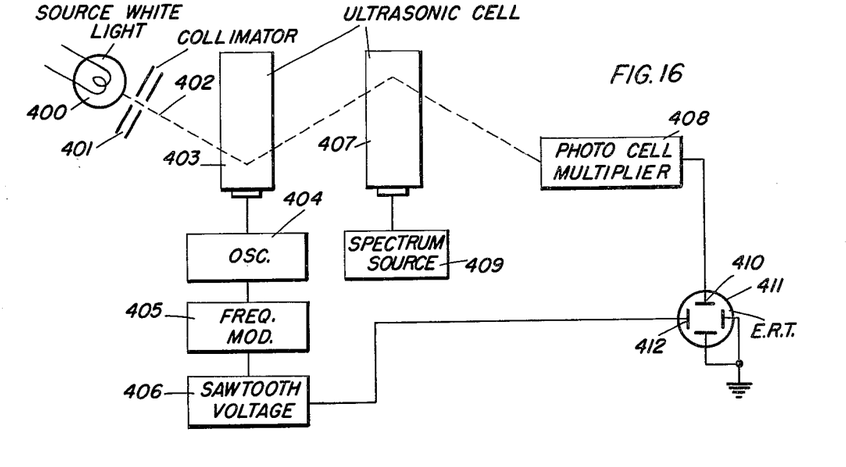
FIGURE 16 is a functional block diagram of a radio spectrum analyzer, wherein a spectrum is displayed on a cathode ray tube, scanning of the spectrum being accomplished by means of ultrasonic cells.

In FIG. 16 of the accompanying drawings is illustrated a radio frequency spectrum analyzer of the scanning type. In this figure is provided a source of light 400, which may be white. The light is collimated by a collimator 401, and applied as a narrow pencil 402 to a first ultrasonic cell 403, at a predetermined angle to the wave fronts in the cell. The cell 403 may be driven in response to the output of an oscillator 404, which is frequency modulated by a modulator 405, the latter being actuated by a saw-tooth voltage deriving from a source 406. Thereby, as in other figures of the drawings, the color of the light reflected from the cell 403 changes continually in frequency in correspondence with the frequency of the oscillator 404. The varying colors or frequencies of light are applied to a second ultrasonic cell 407, at a predetermined angle, and are reflected thereby into a photo-cell multiplier 408 when proper conditions of ultrasonic energy and light energy exist. The transducer of the cell 407 is driven from a spectrum source 409, which may be of relatively wide range, and include any frequencies at random. This source may constitute the output of a traveling wave amplifier of the superheterodyne receiver, or may be derived in any other way known to the art. In any case, the frequencies present in the spectrum source 409 generate each its own diffraction grating in the ultrasonic cell 407, and for each wave length of ultrasonic energy present in the cell 407 one of the light frequencies present in the beam 402 may be reflected to the photo-cell multiplier 408. Since the color of the light applied to the cell 407 is continually changing, a scanning action occurs, in which the spectrum 409 is examined for frequencies in successive values, and when suitable coincidence of light frequency with a frequency present in the source 409 exists, then, and then only, light output is applied to photo-cell multiplier 408. The output of the photo-cell multiplier 408 is applied to the vertical deflection electrode 410 of the cathode ray tube 411, while to the horizontal deflection electrode 412 of the cathode ray tube 411 is applied the saw-tooth voltage output of the source 406. Accordingly, for each value of light frequency a different position of the beam of the cathode ray tube 411 horizontally exists, and when single is applied to the cathode ray tube 411 from the photo-cell multiplier 408, a vertical pip results, which is representative of a frequency present in the output of spectrum source 409.

Figure 17:
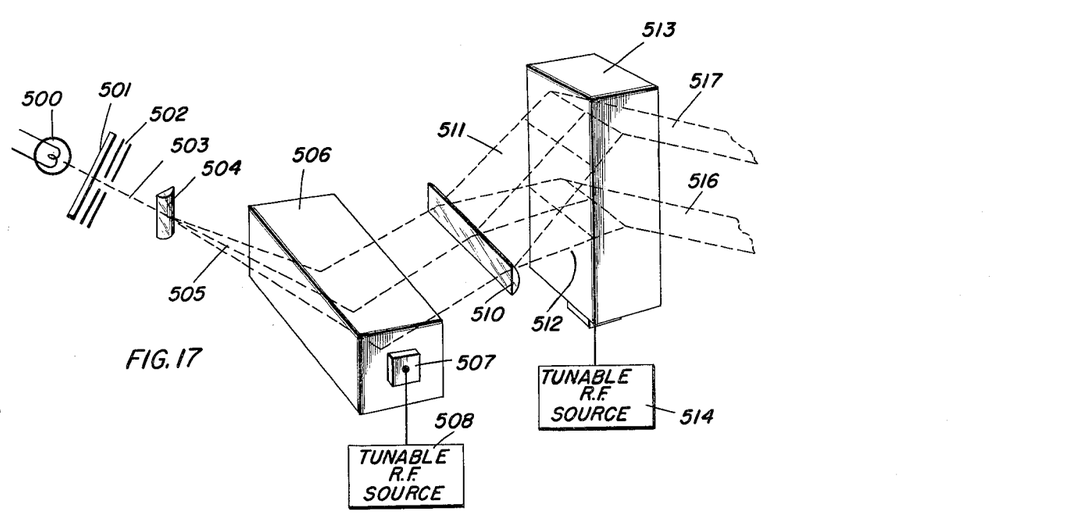
FIGURE 17 is a functional diagram of a system for scanning a spot of light in two dimensions in response to two independent control signals.

In FIG. 17 of the accompanying drawings is illustrated a two-dimensional scanner utilizing ultrasonic cells of the Bragg diffraction type. In this system a source of white light 500 is provided, from which one frequency is filtered by a monochromatic filter 501. The filtered light is then collimated by a collimator 502, and applied as a narrow pencil of light 503 to a diverging lens 504, which in the present application may be assumed to provide a horizontally spread fan-shaped beam of monochromatic light 505. This beam of light is applied to an ultrasonic cell 506, which is horizontally disposed, so that each ray of light in the divergent beam 505 makes a different angle with the wave fronts of the ultrasonic energy in the cell. The cell itself is provided with a transducer 507, driven by a tunable radio frequency source 508, which may be tuned so that it may select one ray out of the beam 505, the particular ray selected being determined by the frequency of the source. If, then, the source 508 be tuned continually over a range of frequencies successively adjacent rays will be selected, and at the output of the cell 506 there will be a horizontal scan of a narrow pencil of light. The system to this point is, accordingly, the same as the system of FIG. 2 of the accompanying drawings.

In the system of FIG. 17, however, the light output of the cell 506 is applied to a horizontal diverging lens 510, which provides at its output a pyramid of light 511. More accurately stated, each pencil of light reflected from the cell 506 is spread into a vertical fan-shaped or diverging beam, as 512. As the horizontal scan continues the horizontal position of the selected fan-shaped divergent beam 512 moves horizontally to trace out a wedge shaped beam of light. The light deriving from the diverging lens 510 is applied to a vertically oriented ultrasonic cell 513, the input frequency to the transducer of which may be derived from a tunable R.F. source 514. By changing the frequency of the output of the tunable R.F. source 514 one ray of light from the diverging beam 512 may be selected, at an angle predetermined by the frequency of the R.F. source 514. This will be true however, regardless of the lateral position of the beam 512. Accordingly, the horizontally scanning beam of light generated by the cell 506 is reflected by the cell 513 at various horizontal levels, as 516, 517. This is equivalent to a vertical scan or a vertical positioning of the horizontal scans. Accordingly, by controlling the frequency of the tunable R.F. sources 508, 514 in suitable cadence, as for example slowly in respect to the source 514, and rapidly in respect to the source 508, a raster may be scanned, of the television type. However, if desired, each oscillator may be assigned a single frequency, in which case the resultant beam of light will assume one definite position in a plane, that position having coordinates determined by the frequencies of the two oscillators. Thereafter, scanning vertically may be accomplished by changing the frequency of the oscillator 514 and scanning horizontally by changing the frequency of the oscillator 508, and composite or two dimensional scanning by changing both frequencies. Accordingly, there is provided an instrument which has many of the capabilities of a cathode ray tube indicator in respect to producing pictures, written figures, or the like, but which may consume less space, require no high D.-C. voltages, and is in other respect superior. The output of the cell 513 may be amplified by means of suitable lens systems, and very large displays provided thereby.

While I have described and illustrated various specific embodiments of the present invention, it will be clear that variations thereof may be resorted to without departing from the true spirit of the invention as defined in the appended claims.

I claim:

1. In combination, means comprising a Bragg diffraction cell for translating multiple colors selected at random into electro-magnetic wave energy of radio frequency having values of a single characteristic representative of said colors, means for transmitting said electro-magnetic wave energy of radio frequency to a remote point, and means including a Bragg diffraction cell at said remote point for receiving said wave energy of radio frequency and for reproducing said colors in response to said values of a single characteristic of said wave energy of radio frequency.

2. In combination, means including a Bragg diffraction cell responsive to colored light having multiple frequencies simultaneously for generating non-visible wave energy having simultaneously frequencies representative of the colors of said colored light, and means including a further Bragg diffraction cell responsive to the frequencies of said wave energy for reproducing the colors of said colored light.

3. In combination, means including a Bragg diffraction cell responsive to colored light for generating non-visible wave energy in pulses having time positions representative of the color of said colored light, and means including a further Bragg diffraction cell responsive to said wave energy for reproducing the color of said colored light.

4. In combination, an ultrasonic cell having means for generating therein ultrasonic waves of frequency and width adequate for Bragg diffraction of light, a source of light of predetermined wave length, means for directing said light into said cell at a predetermined angle with respect to the wave fronts of said ultra-sonic waves, means for varying the frequency of said ultrasonic waves over a range of values, said ultrasonic cell arranged to reflect said light of predetermined wave length only in response to ultrasonic waves of a predetermined length by Bragg diffraction, means for generating wave energy of frequency which is continually functionally related to the length of said ultrasonic wave, and means responsive to reflection of said light by said ultra-sonic cell for transmitting said last mentioned wave energy only while said light is reflected by said ultrasonic cell.

5. In combination, a source of frequency modulated voltage, a source of a light beam, means comprising an ultrasonic cell responsive to said frequency modulated voltage for periodically scanning the frequencies present in said light beam, said last mentioned means including means for generating in said ultra-sonic cell ultra-sonic waves of frequency and width adequate for Bragg diffraction of said light, means for directing said light into said ultra-sonic cell at a predetermined angle with respect to the wave fronts of said ultra-sonic waves, said ultra-sonic cell being capable of transmitting light only upon existence of a predetermined functional relation between the frequency of said light and the frequency of said voltage, and means for transmitting non-visible signal to a remote point only in response to transmission of said light by the first mentioned means, said frequency modulated voltage being frequency modulated in a periodically repetitive time pattern of frequency with time having equal periods of repetition.

6. The combination in accordance with claim 5, wherein said signal is an electro-magnetic wave and possesses a frequency functionally related to the frequency of said voltage.

7. In an analyzer for analyzing the frequency content of light, an ultrasonic cell, means for generating in said ultra-sonic cell ultra-sonic waves of frequency and width adequate for Bragg diffraction of light, means for passing light into said cell at a predetermined angle with respect to the wave fronts of said ultra-sonic waves, a photo-cell for receiving light Bragg diffracted by said cell, means for varying the frequency of said waves over a range of values, and means for visually plotting the output of said photo-cell against the frequency of said waves.

8. In combination, means for translating a color selected at random into electro-magnetic wave energy of non-visible wave length and having a frequency representative of said color, said last means comprising a supersonic Bragg diffraction device and means for varying the wave length of the supersonic energy in said device over a range of values including values suitable for transmitting said color by Bragg diffraction, and means for receiving said wave energy and translating said wave energy into colored light.

9. In combination, an ultra-sonic cell having means for generating therein ultra-sonic waves of frequency range and width adequate for Bragg diffraction of light, a source of light, means for directing said light into said cell at a single angle only with respect to the wave fronts of said ultra-sonic waves, said angle being selected to provide Bragg diffraction of said light, said light being polychromatic, electronic scanning means for scanning periodically at constant frequency of scanning and at constant repetition period the frequency of said ultra-sonic waves over a range of values adequate to provide Bragg diffraction of all the frequencies of said light in sequence and repetitively in equal periods, means for transmitting a radio signal in response to each Bragg transmission of light by said ultrasonic cell during said scanning, said last means comprising a photo-electric device responsive to light Bragg diffracted by said ultra-sonic cell to generate an output signal, and a radio transmitter responsive to said output signal to transmit said radio signal.

10. In combination, an ultrasonic cell having means for generating therein ultrasonic waves of frequency and width suitable for Bragg diffraction of electromagnetic waves injected into said ultrasonic cell, a source of said electromagnetic waves of at least one predetermined wave length, means for directing said electromagnetic waves into said cell at a single predetermined angle with respect to the wave fronts of said ultrasonic waves, means for varying the frequency of said ultrasonic waves over a range of values, said ultrasonic cell being arranged to reflect said electromagnetic waves of predetermined wave lengths only in response to ultrasonic waves of a predetermined length by Bragg diffraction, means for generating wave energy of frequency which is continually functionally related to the length of said ultrasonic waves, and means responsive to reflection of said electromagnetic waves by said ultrasonic cell for transmitting said last mentioned wave energy only when said electromagnetic waves are reflected by said ultrasonic cells.

11. The combination according to claim 10 wherein said source of electromagnetic waves provides electromagnetic waves of a plurality of different wave lengths simultaneously.

12. In combination, a source of frequency modulated voltage, a source of a beam of electromagnetic waves, means comprising an ultrasonic cell responsive to said frequency modulated voltage for periodically scanning the frequencies present in said electromagnetic waves, said means being capable of transmitting said electromagnetic waves only upon existence of a predetermined functional relation between the frequency of said electromagnetic waves and the frequency of said voltage, and means for transmitting non-visible signal to a remote point only in response to transmission of said electromagnetic waves by said first mentioned means, said last mentioned means including means for generating in said ultrasonic cell ultrasonic waves of frequency and width adequate for Bragg diffraction of said electromagnetic waves, means directing said electromagnetic waves into said ultrasonic cell at a predetermined angle with respect to the wave fronts of said ultrasonic waves, said frequency modulated voltage being frequency modulated in a periodically repetitive time pattern of frequency with time having equal periods of repetition.

13. In an analyzer for analyzing the frequency content of electromagnetic waves, an ultrasonic cell, means for generating in said ultrasonic cell waves of frequency and width adequate for Bragg diffraction of said electromagnetic waves, means for passing said electromagnetic waves into said cell at a predetermined angle with respect to the wave fronts of said ultrasonic waves, a detector for receiving electromagnetic waves Bragg diffracted by said electromagnetic cell, means for varying the frequency of said ultrasonic waves over a range of values, and means for visually plotting the output of said detector against the frequency of said waves.

14. In an anlyzer for analyzing the frequency content of electromagnetic waves, an ultrasonic cell, means for generating in said ultrasonic cell ultrasonic waves of frequency and width adequate for Bragg diffraction of said electromagnetic waves, means for passing said electromagnetic waves into said cell at a predetermined angle with respect to the wave fronts of said ultrasonic waves, a detector for receiving electromagnetic waves Bragg diffracted by said cell, means for varying the frequency of said ultrasonic waves over a range of values, and means for indicating the output of said detector against the frequency of said ultrasonic waves.

15. In combination, an ultrasonic cell having means for generating therein ultrasonic waves of frequency range and width adequate for Bragg diffraction of electromagnetic waves, a source of said electromagnetic waves, means for directing said electromagnetic waves into said cell at a single angle only with respect to the wave fronts of said ultrasonic waves, said angle being selected by Bragg diffraction of said electromagnetic waves, said electromagnetic waves including a plurality of different frequencies, electronic scanning means for scanning periodically at constant frequency of scanning and at fixed repetition period the frequency of said ultrasonic waves over a range of values adequate to provide Bragg diffraction of all the frequencies of said electromagnetic waves in sequence and repetitively in equal periods, means for transmitting a signal in response to each Bragg transmission of electromagnetic wave by said ultrasonic cell during said scanning, said last means comprising a detector responsive to electromagnetic waves Bragg diffracted by said ultrasonic cell to generate an output signal and a transmitter responsive to said output signal to transmit said first mentioned signal.

16. In combination, means comprising a Bragg diffraction supersonic cell for translating an electromagnetic wave having a frequency selected at random into electromagnetic wave energy of non-visible wave length and having at least one characteristic representative of said frequency, means responsive to said electromagnetic wave energy for reproducing said first mentioned frequency wherein said supersonic cell includes a medium, means for generating in said medium ultrasonic waves with frequency and width of wave front adequate for Bragg diffraction of electromagnetic waves of said frequency selected at random, a source of said electromagnetic waves of said frequency selected at random, means for directing said electromagnetic waves into said cell at a single angle only with respect to the wave fronts of said ultrasonic waves, said angle being selected to provide Bragg diffraction of said electromagnetic waves.

17. In combination, means comprising a Bragg diffraction supersonic cell for translating multiple simultaneous colors selected at random into electromagnetic wave energy of nonvisible wave length and having characteristics representative of all said colors, and means comprising a further Bragg diffraction supersonic cell responsive to said wave energy for reproducing said colors, said first named supersonic cell including a medium, means for generating in said medium ultrasonic waves of frequency and width of wave front adequate for Bragg diffraction of light of said colors selected at random, a source of said light of said colors selected at random, means for directing said light into said first named cell at a single angle only with respect to the wave fronts of said ultrasonic waves, said angle being selected to provide Bragg diffraction of said light.

References Cited in the file of this patent

UNITED STATES PATENTS

| | | |
|---|---|---|
| 1,450,061 | Coblentz | Mar. 27, 1923 |
| 1,728,003 | Nickle | Sept. 10, 1929 |
| 1,732,874 | Zworykin | Oct. 22, 1929 |
| 1,787,334 | Abel | Dec. 30, 1930 |
| 1,849,488 | Hanna | Mar. 15, 1932 |
| 2,043,484 | Miller | June 9, 1936 |
| 2,084,201 | Karolus | June 15, 1937 |

(Other references on following page)

UNITED STATES PATENTS

| | | |
|---|---|---|
| 2,158,990 | Okolicsanyi | May 16, 1939 |
| 2,234,329 | Wolff | Mar. 11, 1941 |
| 2,240,722 | Snow | May 6, 1941 |
| 2,270,232 | Rosenthal | Jan. 20, 1942 |
| 2,287,587 | Willard | June 23, 1942 |
| 2,294,820 | Wilson | Sept. 1, 1942 |
| 2,308,360 | Fair | Jan. 12, 1943 |
| 2,377,242 | Kent | May 29, 1945 |
| 2,444,560 | Feldt et al. | July 6, 1948 |
| 2,446,874 | Geffner et al. | Aug. 10, 1948 |
| 2,485,591 | Greig | Oct. 25, 1949 |
| 2,513,520 | Rosenthal | July 4, 1950 |
| 2,515,054 | Pagliarulo | July 11, 1950 |
| 2,519,083 | Sutter et al. | Aug. 15, 1950 |
| 2,534,846 | Ambrose et al. | Dec. 19, 1950 |
| 2,580,498 | Ackerlind | Jan. 1, 1952 |
| 2,622,470 | Rines | Dec. 23, 1952 |
| 2,623,942 | Schlesinger | Dec. 30, 1952 |

OTHER REFERENCES

Willard, G. W.: "Criteria for Normal and Abnormal Ultrasonic Light Diffraction Effects," pages 101–108, Journal of the Acoustical Society of America, vol. 21, No. 2, March 1949.